US012560463B2

(12) United States Patent
Jiang et al.

(10) Patent No.: US 12,560,463 B2
(45) Date of Patent: Feb. 24, 2026

(54) FLOW RATE MEASUREMENT METHOD FOR SPIRAL THROTTLING COMPONENT

(71) Applicants:CNOOC (CHINA) CO., LTD, Tianjin (CN); CNOOC CHINA LIMITED, HAINAN BRANCH, Haikou (CN); HAIMO SUBSEA TECHNOLOGY (SHANGHAI) CO., LTD., Shanghai (CN)

(72) Inventors: Donglei Jiang, Haikou (CN); Yanzhi Pan, Shanghai (CN); Haodong Chen, Haikou (CN); Xiaowei Ma, Shanghai (CN); Wentuo Li, Haikou (CN); Guangfu Li, Shanghai (CN); Juncai Jia, Haikou (CN); Chunmin Zeng, Haikou (CN); Lian He, Haikou (CN); Heng Wang, Haikou (CN)

(73) Assignees: CNOOC (CHINA) CO., LTD, Tianjin (CN); CNOOC CHINA LIMITED, HAINAN BRANCH, Haikou (CN); HAIMO SUBSEA TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 19/112,276

(22) PCT Filed: Aug. 27, 2024

(86) PCT No.: PCT/CN2024/114671
§ 371 (c)(1),
(2) Date: Mar. 17, 2025

(87) PCT Pub. No.: WO2025/045007
PCT Pub. Date: Mar. 6, 2025

(65) Prior Publication Data
US 2025/0321128 A1 Oct. 16, 2025

(30) Foreign Application Priority Data

Apr. 16, 2024 (CN) .......................... 202410452366.6

(51) Int. Cl.
*G01F 1/36* (2006.01)
*G01F 25/10* (2022.01)

(52) U.S. Cl.
CPC ................ *G01F 1/36* (2013.01); *G01F 25/10* (2022.01)

(58) Field of Classification Search
CPC .................................... G01F 1/36; G01F 25/10
(Continued)

(56) References Cited

U.S. PATENT DOCUMENTS

2010/0094569 A1 4/2010 Gysling

FOREIGN PATENT DOCUMENTS

CN 111323087 A 6/2020
CN 211121383 U 7/2020
(Continued)

*Primary Examiner* — Peter J Macchiarolo
*Assistant Examiner* — John M Royston
(74) *Attorney, Agent, or Firm* — Bayramoglu Law Offices LLC

(57) ABSTRACT

A flow rate measurement method for a spiral throttling component is provided, where a spiral flow channel is formed inside the spiral throttling component, and the method includes: introducing a calibration medium into the spiral throttling component, obtaining a plurality of flow rates Qv, diameter of the spiral flow channel d, effective length L of the spiral flow channel, pressure drop DP of a fluid flowing through the spiral flow channel, and density of fluid density ρ, figuring out a relationship of k=f(Qv, d, L, DP and ρ) to obtain a calculation formula of the flow rate Qv. Through the technical solution, a calculation formula for the spiral flow channels with different sizes can be obtained by (Continued)

using a small amount of calibrations, thereby avoiding mismatch of flow formulae when a size of the spiral flow channel changes.

6 Claims, 11 Drawing Sheets

(58) Field of Classification Search
USPC ...................................................... 73/861.42
See application file for complete search history.

(56) References Cited

FOREIGN PATENT DOCUMENTS

| CN | 113566908 | A | | 10/2021 | | |
|----|-----------|---|---|---------|---|---|
| CN | 115420342 | A | | 12/2022 | | |
| CN | 116295672 | A | * | 6/2023 | .............. | G01F 1/34 |
| CN | 118050058 | A | | 5/2024 | | |
| JP | 6299025 | B1 | | 3/2018 | | |

* cited by examiner

1

FLOW RATE MEASUREMENT METHOD FOR SPIRAL THROTTLING COMPONENT

CROSS REFERENCE TO THE RELATED APPLICATIONS

This application is the national phase entry of International Application No. PCT/CN2024/114671, filed on Aug. 27, 2024, which is based upon and claims priority to Chinese Patent Application No. 202410452366.6, filed on Apr. 16, 2024, the entire contents of which are incorporated herein by reference.

TECHNICAL FIELD

The present disclosure relates to the technical field of fluid metering, and particularly relates to a flow rate measurement method for a non-standard throttling channel.

BACKGROUND

In order to greatly reduce a fluid pressure, researchers have previously proposed a labyrinth-type throttling and pressure reducing component, which uses a spiral flow channel to reduce a pressure of high-pressure fluid (such as medicine). A cross section of the spiral flow channel is circular, and the spiral flow channel has an overall screw thread shape. One single spiral flow channel or a plurality of the spiral flow channels with a concentric structure inside or outside can be provided, depending on actual needs. The throttling and pressure reducing component is usually integrated into a flowmeter for measuring a flow rate of the fluid passing through the flowmeter.

A flow rate measurement method/formula of the flowmeter varies with a type of the flowmeter. Specific flow rate calculation formulae for differential pressure flowmeters (such as Venturimeter and orifice-plate flowmeter) are different, and the differences are well-known to those skilled in the art and will not be described in detail here.

When the spiral flow channel is adopted for pressure reduction and measurement, the known empirical formulae are no longer applicable. Therefore, researchers proposed a series of solutions for flow rate measurement of the spiral flow channels afterwards. However, the solutions were based on the spiral flow channels with fixed sizes (that is, fixed diameter and length), and size parameters of the spiral flow channels were not included into the flow rate measurement formulae. Therefore, when a size of the spiral flow channel is adjusted according to market demands (diameter and length of the spiral flow channel need to be adjusted), algorithms used in the series of solutions resulted in significant measurement errors.

There are two approaches to solving the above problems: a first is to explore a corresponding algorithm for each size of the spiral flow channel; and a second is to include the size parameters of the spiral flow channel into the flow rate measurement algorithm. It can be expected that a solution formed according to the second approach will have wider applicability for flow rate measurement of spiral flow channels with various sizes in the future.

SUMMARY

The present disclosure primarily solves the fundamental problem of adaptive measurement of a flow rate calculation formula for a spiral flow channel when a size of the spiral flow channel changes. The primary technical solution to the problem is as follows:

a flow rate measurement method for a spiral throttling component, where a spiral flow channel is formed inside the spiral throttling component, and the spiral throttling component is further provided with a differential pressure sensor, and the differential pressure sensor is used to measure a pressure drop (DP) before and after a fluid flows through the spiral flow channel; specifically including the following steps:

step 1. introducing a calibration medium into the spiral throttling component, acquiring a plurality of calibration datasets, with each of the calibration datasets including flow rate Qv, pressure drop DP, and Reynolds number Re at a same moment;

step 2. calculating a flow coefficient k of the calibration medium flowing through the spiral throttling component according to the following Formula ①;

$$k = \frac{Qv}{\dfrac{d^n}{L^m} * \sqrt{\dfrac{DP}{\rho}}}, \qquad \text{Formula ①}$$

d and L are diameter and equivalent length of the spiral flow channel, and n and m are exponents thereof;

DP is a pressure drop before and after the calibration medium flows through the spiral flow channel;

$\rho$ is a density of the calibration medium;

values of the exponents n and m are unknown at the very beginning, and need to be assigned manually (generally based on experience), the values of the exponents n and m then need to be adjusted continuously in order to obtain a clear k-Re relationship until a credible relationship of k=f(Re) is obtained;

step 3. calculating a flow rate Q of a fluid to be measured that flows through the spiral throttling component according to the Formula ②;

$$Q = K * \frac{d^n}{L^m} * \sqrt{\frac{DP'}{\rho'}}, \qquad \text{Formula ②}$$

DP' is a pressure drop before and after the fluid to be measured flows through the spiral flow channel;

$\rho'$ is a density of the fluid to be measured;

K is a flow coefficient of the fluid to be measured;

$$\begin{cases} K = a_1 * \ln(Re) - b_1, Re < x_1; \\ K = a_2 * \ln(Re) - b_2, x_1 \le Re < x_2; \\ K = c, Re \ge x_2 \end{cases}$$

$x_1$ and $x_2$ are two piecewise values, which are respectively taken as the piecewise values of the low, medium and high Reynolds numbers;

$a_1, b_1, a_2, b_2$ and c are all fitting parameters for a medium Reynolds number, which are obtained by fitting the credible relationship of k=f(Re) in the Step 2; and Re is a Reynolds number for the fluid to be measured.

the difficulty of the above solution lies in figuring out suitable values for n and m, which requires a large amount of data calculations and simulation; and a credible relationship of k=f(Re) is usually determined subjectively, such that final values of selected for n and m could have many possibilities. Although specific flow rate calculation parameters obtained from calibration and fitting for a spiral flow channel with one size could not be directly applicable to those with other sizes, a same basic relationship is provided in the above solution. For the spiral flow channels with other sizes, the specific flow rate calculation parameters can be obtained by appropriate calibration, which is also beneficial for expanding the adaptability of flow measurement for the spiral flow channels with different sizes. Of course, the two piecewise values, $x_1$ and $x_2$, are also determined subjectively.

On the basis of solving the above fundamental problem, in order to further adapt to the flow rate measurement for spiral throttling components with different sizes, it is also necessary to solve the problem that the flow rate calculation parameters for the spiral throttling components with unknown sizes need to be further calibrated. Further, the present disclosure employs the following technical solution to eliminate the needs for calibration of flow rate calculation parameters for the spiral throttling components with unknown sizes:

the diameter d and/or equivalent length L of the spiral flow channel are changed, such that different characteristic sizes of the spiral flow channel can be obtained;

repeating the steps 1 and 2 to obtain credible relationships of k=f(Re) for a plurality of different characteristic sizes; and comparing a normalization degree of k=f(Re) for different characteristic sizes, and continuing to adjust the values of n and m until the relationships of k=f(Re) for different characteristic sizes under a same set of values of n and m achieve a credible normalization degree; and the normalization degree is also determined subjectively;

Since each size of the spiral flow channel corresponds to a credible relationship of k=f(Re), in order to facilitate the calculation of the flow coefficient K of the fluid to be measured in the step 3 and improve the accuracy of a fitting structure, the parameters $a_1$, $b_1$, $a_2$, $b_2$ and c in the step 3 are fitted from the credible k-Re data corresponding to the spiral flow channels with all different characteristic sizes obtained in the step 2.

DETAILED DESCRIPTION OF THE EMBODIMENTS

Embodiment 1

Figure 1:
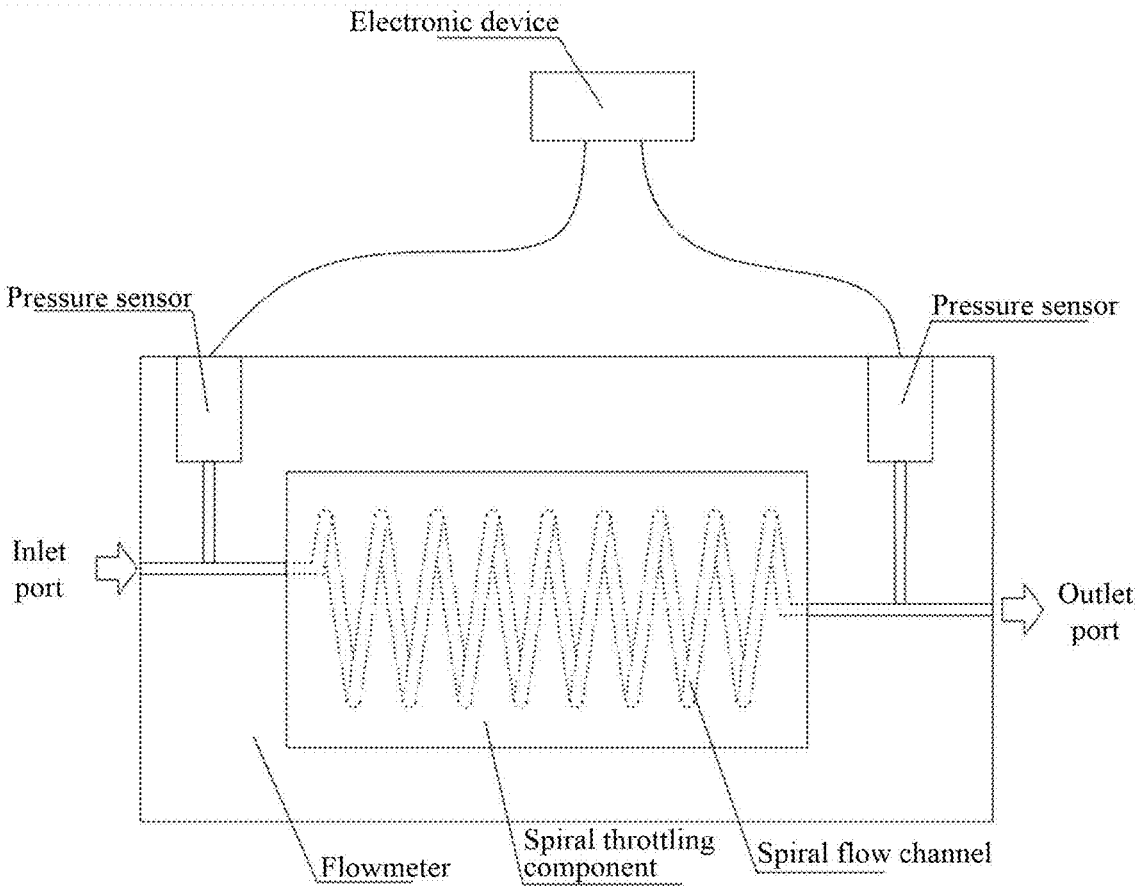
FIG. 1 is a structural schematic diagram of a flowmeter provided with a spiral throttling component.

A flow rate measurement method for a spiral throttling component, where a spiral flow channel is formed inside the spiral throttling component, as shown in FIG. 1, the spiral flow channel is spirally wound inside the spiral throttling component, and the spiral flow channel is a through hole with a circular cross section; the spiral flow channel can be one or more spiral flow channel more spiral flow channel; when more spiral flow channels are provided, the channels are arranged in a concentric structure from inside to outside, and centerlines of all the spiral flow channels coincide; and the spiral throttling component is further provided with a differential pressure sensor, the differential pressure sensor is used to measure a pressure drop (DP) before and after a fluid flows through the spiral flow channel;

specifically including the following steps:

Step 1. introducing a calibration medium into the spiral throttling component for a fixed period of time for calibration, acquiring/calculating relevant data at regular intervals during the period to generate a plurality of calibration datasets, with each of the calibration datasets including flow rate Qv, pressure drop DP, and Reynolds number Re at a same moment, where the Reynolds number Re is calculated and obtained based on other related parameters measured during the flow, and a specific calculation formula is the prior art and will not be described in detail here.

Step 2. calculating a flow coefficient k of the calibration medium flowing through the spiral throttling component according to the following Formula 1;

$$k = \frac{Qv}{\frac{d^n}{L^m} * \sqrt{\frac{DP}{\rho}}}, \qquad \text{Formula ①}$$

where d is a diameter of the spiral flow channel;

L is an equivalent length of the spiral flow channel;

n and m are both exponents;

DP is a pressure drop before and after the calibration medium flows through the spiral flow channel;

ρ is a density of the calibration medium;

the exponents n and m are unknown at the very beginning, any set of n and m values can be given based on the experience, and the values can be substituted into Formula (1), and the values of n and m need to be continuously corrected. Specifically, the values of n and m should be adjusted to obtain a clear k-Re relationship, that is, that is, the adjustment of values of n and m are adjusted is guided by obtaining a clear k-Re functional relationship until a credible relationship of k=f(Re), where the credible relationship of k=f(Re) is subjectively determined; when changes in k are relatively regular with Re over a given interval or as a whole, it can be considered that the current values of n and m make k-Re reach the credible relationship of k=f(Re); a more specific method for determining a credible relationship of k=f(Re) is as follows: adjusting values of n and m, calculating flow coefficients k for a plurality of datasets of the calibration medium under each set of values n and m, plotting k-Re curves, respectively, selecting one relatively smooth and continuous k-Re curve thereof for fitting to obtain the credible relationship of k=f(Re); and the relationship of k=f(Re) can be global or segmented.

Step 3. calculating a flow rate Q of a fluid to be measured that flows through the spiral throttling component according to the following Formula ②;

$$Q = K * \frac{d^n}{L^m} * \sqrt{\frac{DP'}{\rho'}}, \qquad \text{Formula ②}$$

DP' is a pressure drop before and after the fluid to be measured flows through the spiral flow channel;
$\rho'$ is a density of the fluid to be measured;
K is a flow coefficient of the fluid to be measured;

$$\begin{cases} K = a_1 * \ln(\text{Re}) - b_1, & \text{Re} < x_1; \\ K = a_2 * \ln(\text{Re}) - b_2, & x_1 \le \text{Re} < x_2; \\ \qquad K = c, & \text{Re} \ge x_2; \end{cases}$$

$a_1$ and $b_1$ are fitting parameters for a low Reynolds number, which are obtained by fitting the credible relationship of k=f(Re) in the Step 2;
$a_2$ and $b_2$ are fitting parameters for a medium Reynolds number, which are obtained by fitting the credible relationship of k=f(Re) in the Step 2;
c is a fitting constant for a high Reynolds number, which is obtained by fitting the credible relationship of k=f (Re) in the Step 2;
Re is a Reynolds number for the fluid to be measured;
$x_1$ is a piecewise value of the low Reynolds number and the medium Reynolds number; and
$x_2$ is a piecewise value of the medium Reynolds number and the high Reynolds number.

For spiral flow channels with different sizes (with different diameters d and/or equivalent lengths L), appropriate calibration can be performed each time to obtain related parameters of the corresponding spiral flow channel.

In order to further simplify, and even eliminate the calibration of spiral flow channels with different sizes, the following steps can be performed:
the diameter d and/or equivalent length L of the spiral flow channel are changed, such that different characteristic sizes of the spiral flow channel can be obtained;

repeating the steps 1 and 2 to obtain credible relationships of k=f(Re) for a plurality of different characteristic sizes; and
comparing a normalization degree of k=f(Re) for different characteristic sizes, continuing to adjusting the values of the exponents n and m until the relationships of k=f(Re) for different characteristic sizes reaches a credible normalization degree under a same set of values of n and m; by combining the more specific method for determining a credible relationships of k=f(Re) described above, a credible method for determining the normalization is as follows: plotting k-Re curves for the credible relationships of k=f(Re) for different characteristic sizes, and observing and comparing overlap of the k-Re curves for different characteristic sizes; when the overlap of the k-Re curves for different characteristic sizes is poor, the values of the exponents n and m should be adjusted until the k-Re curves have a high degree of overlap, thereby specifying that the relationships of k=f(Re) for different characteristic sizes achieve the credible normalization degree, and the credible normalization degree is subjectively determined.

Correspondingly, since the Step 2 generates a plurality of credible relationships of k=f(Re), a plurality of k-Re datasets for different characteristic sizes are generated; and in the Step 3, the plurality of k-Re datasets for different characteristic sizes are merged into an entirety to fit the parameters $a_1$, $b_1$, $a_2$, $b_2$ and c in the Step 3.

The determination process of the exponents n and m requires massive calculations, and a plurality of observations and comparisons are also required during the process, which is time-consuming and labor-intensive. In order to guide the selection of values of n and m, the following approach can be used to adjust the values:
selecting spiral flow channels with two different characteristic sizes, where the spiral flow channel with a first characteristic size has a diameter of d1 and an equivalent length of L1, and the spiral flow channel with a second characteristic size has a diameter of d2 and an equivalent length of L2; and
selecting a plurality of calibration datasets corresponding to a high Reynolds number range for the two different characteristic sizes; and the flow coefficient k at the high Reynolds number is likely to be a constant according to the experience; and a relationship of Qv–(DP, ρ) is fitted according to the following Formula ③:

$$Qv = K' \sqrt{DP/\rho}; \qquad \text{Formula ③}$$

K' is a coefficient that includes the characteristic size of the spiral flow channel;
a coefficient obtained by fitting the spiral flow channel with the first characteristic size is K1', which is a constant;
a coefficient obtained by fitting the spiral flow channel with the second characteristic size is K2', which is a constant; and
the values of the exponents n and m also satisfy the following Formula ④;

$$\frac{d1^n}{L1^m} / \frac{d2^n}{L2^m} = K1'/K2'. \qquad \text{Formula ④}$$

In fact, many possible values of n and m that can satisfy Formula ④, and unique values of n and m cannot be directly obtained through Formula ④; however, the relationship between n and m is clarified, which will greatly reduce a number of adjustments to the values of n and m, thereby reducing a workload of calculations and comparison to some extent. After identifying the values of the exponents n and m according to the relationship from Formula ④, the spiral flow channels of other characteristic sizes can be subject to the calibration and verification, which are observed and compared with results of the first and second characteristic sizes in terms of normalization degree; and when the normalization degree is insufficient, and the values of n and m can be further adjusted within the above scope of constraints until the relationship of k=f(Re) for different characteristic sizes achieve the credible normalization degree, and satisfy the requirements of Formula ④ at the same time.

Embodiment 2

Three spiral flow channels with different characteristic sizes are designed for calibration tests, and sizes of the three spiral flow channels with different characteristic sizes are respectively as follows:

- a diameter of the spiral flow channel with a first characteristic size is d1=2 mm, and an equivalent length thereof is L1=9056.22 mm;
- a diameter of the spiral flow channel with a second characteristic size is d2=3 mm, and an equivalent length thereof is L2=4247.26 mm;
- a diameter of the spiral flow channel with a third characteristic size is d3=4 mm, and an equivalent length thereof is L3=3101.21 mm; and
- following the method in Embodiment 1: as described in the Step 1, introducing suitable calibration media into the spiral flow channels with the three different sizes to obtain a plurality of calibration datasets, and a Reynolds number range of the calibration datasets spans from 3-35,000, with a total data volume being hundreds of thousands. This embodiment will be further specified in conjunction with the accompanying drawings.

The flow coefficients k of the calibration media are calculated according to the method in the Step 2, and a set of values of n and m are initially given in combination with the experience, and are continuously corrected.

Figure 2:
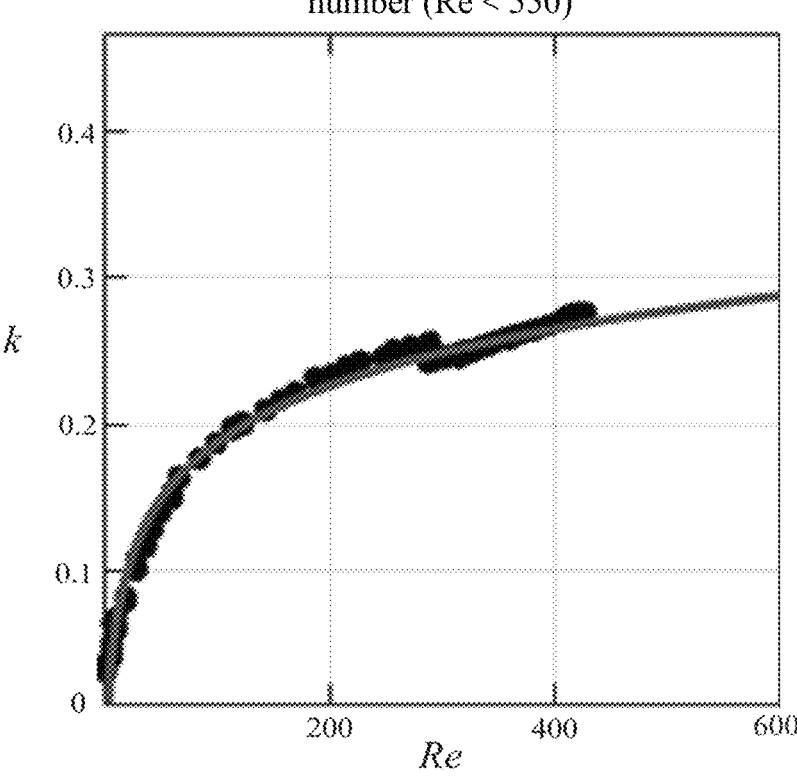
FIG. 2 is a curve of a considered credible relationship of k=f(Re) for a spiral flow channel with a second characteristic size in a low Reynolds number (Re<550) range.
Figure 3:
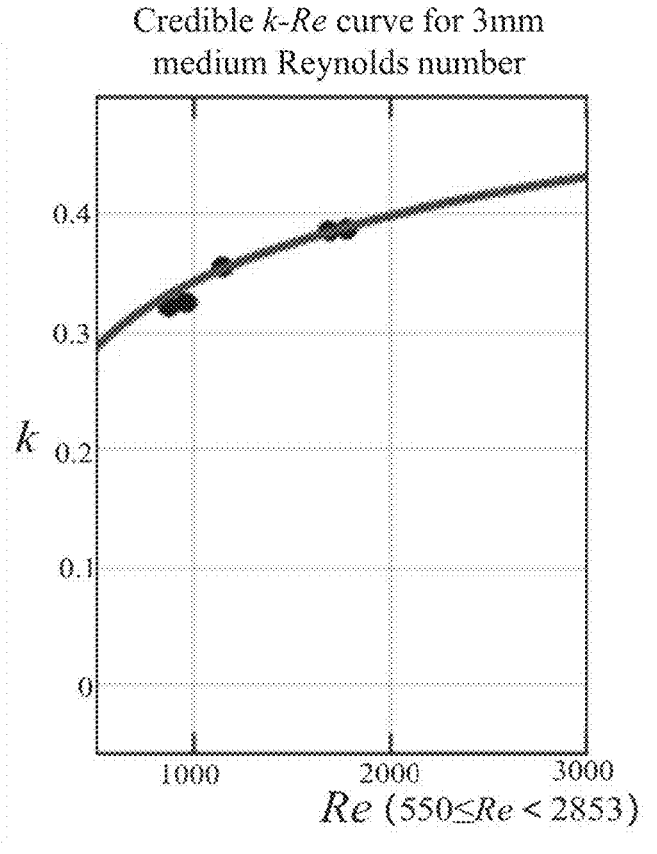
FIG. 3 is a curve of a considered credible relationship of k=f(Re) for a spiral flow channel with a second characteristic size in a medium Reynolds number (550≤Re<2853) range.
Figure 4:
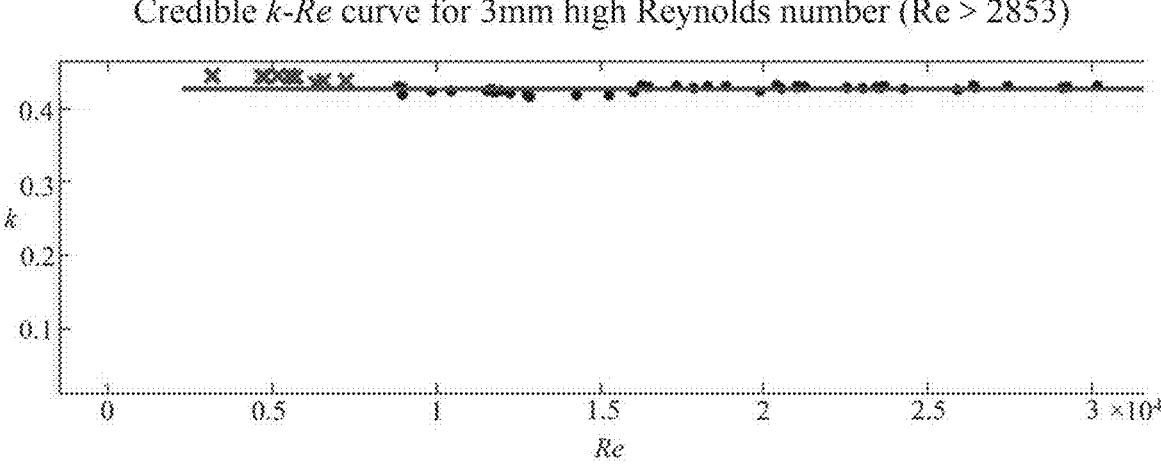
FIG. 4 is a curve of a considered credible relationship of k=f(Re) for a spiral flow channel with a second characteristic size in a high Reynolds number (2853≤Re) range.
Figure 5:
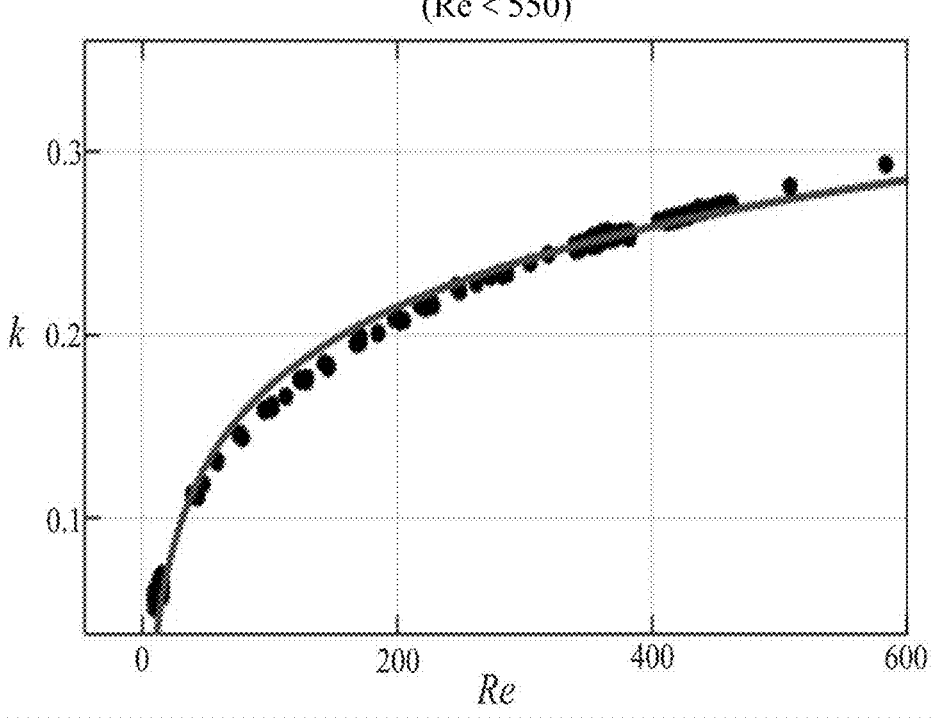
FIG. 5 is a curve of a considered credible relationship of k=f(Re) for a spiral flow channel with a third characteristic size in a low Reynolds number (Re<550) range.
Figure 6:
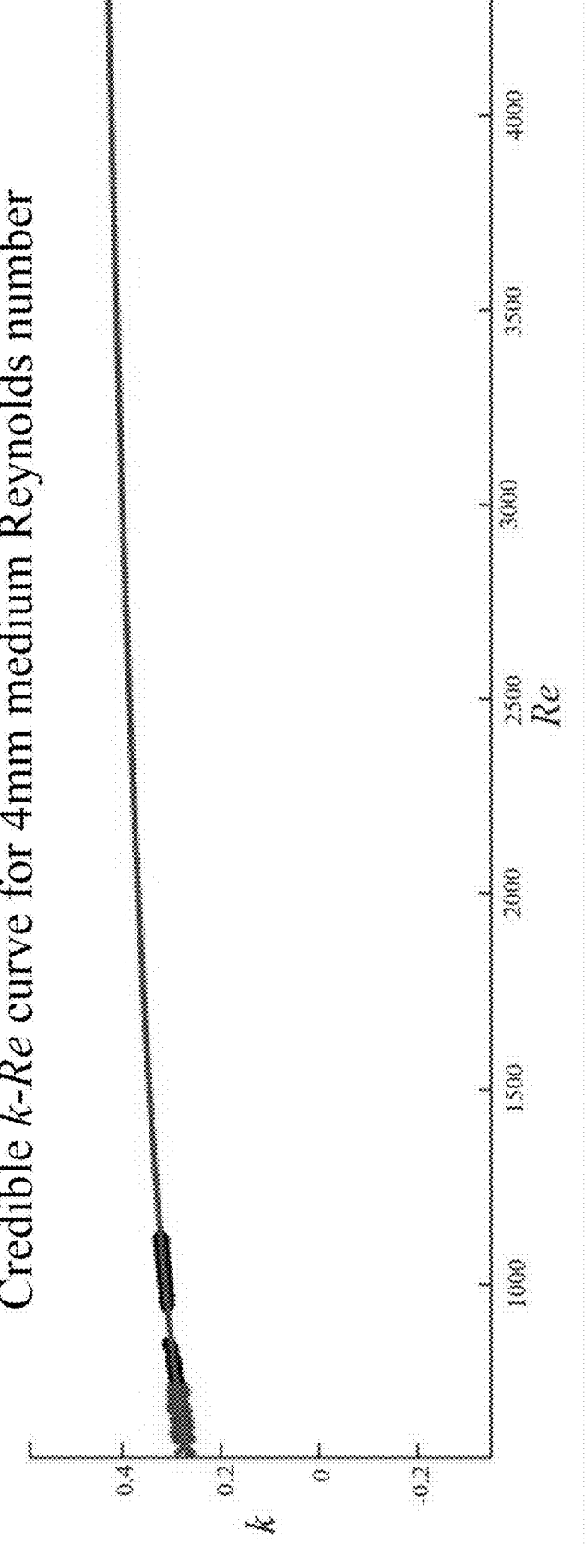
FIG. 6 is a curve of a considered credible relationship of k=f(Re) for a spiral flow channel with a third characteristic size in a medium Reynolds number (550≤Re<2853) range.

When the values of n and m are determined separately for the spiral flow channels with the three different sizes, and since the credible relationship of k=f(Re) is subjectively determined, there could be many possible n and m values, and the values of n and m for different characteristic sizes could also vary; and taking the spiral flow channels with the second and third characteristic sizes as an example:

- selecting a curve of the credible relationship of k=f(Re) in a low Reynolds number (Re<550) for the spiral flow channel with the second characteristic size (d2=3 mm, L2=4247.26 mm), which is shown in FIG. 2, and a curve thereof in a medium Reynolds number range (550≤ Re<2853) is shown in FIG. 3, and a curve thereof in a high Reynolds number range (Re≥2853) is shown in FIG. 4;
- selecting a curve of the credible relationship of k=f(Re) in a low Reynolds number (Re<550) for the spiral flow channel with the third characteristic size (d3=4 mm, L3=3101.21 mm), which is shown in FIG. 5, and a curve thereof in a medium Reynolds number range (550≤Re<2853) is shown in FIG. 6;

it can be seen from FIGS. 2-6 that after appropriate values for n and m are selected, the relationship between the flow coefficient k and Reynolds number Re is clear and definite within a certain Reynolds number range, the k-Re curves are relatively smooth and continuous, which can be considered as the credible relationship of k=f(Re); and it should be specifically note that the values of n and m determined for the second characteristic size are different from those determined for the third characteristic size, which leads to insufficient normalization of the two credible relationships of k=f(Re), and the insufficiency can be identified by comparing FIGS. 2 and 5, as well as FIGS. 3 and 6.

In selecting the credible relationships of k=f(Re), it can also be performed by setting relevant constraints.

The spiral flow channels with the other two characteristic sizes are similar to that of the spiral flow channel with the third characteristic size. Since the values of n and m are determined separately for each characteristic size, data and curves corresponding to each characteristic size cannot be exhaustively enumerated, and will not be described in detail here.

The values of n and m for the spiral flow channels with the three characteristic sizes will be uniformly determined, this process aims to solve the problem of great differences in the credible relationships of k=f(Re) after the values of n and m for each different characteristic size are separately determined, and to seek a high normalization degree for the credible relationships of k=f(Re) for all characteristic sizes; and the credible curves of k=f(Re) selected for the individual determination of values of n and m for the spiral flow channels with the three characteristic sizes are plotted on a same coordinate system, the normalization degrees of the relationship of k=f(Re) for different characteristic sizes are compared and observed, and can also be subjectively determined or be set according to relevant constraints.

Two spiral flow channels with the first and second characteristic sizes are selected to assist in determining the values of n and m, the flow coefficient for the spiral flow channel with the first characteristic size is k1, and the flow coefficient for the spiral flow channel with the second characteristic size is k2;

$$\text{assuming } K1' = k1 * \frac{d1^n}{L1^m};$$

$$\text{assuming } K2' = k2 * \frac{d2^n}{L2^m};$$

For the spiral flow channel with a fixed characteristic size, when Qv, Dp and ρ are known, K1' and K2' can be obtained easily; the flow coefficient k for the high Reynolds numbers is likely a constant according to experience, and K1' and K2' are also constants accordingly, which provides the possibility for calculating K1' and K2', and exploring the relationship of n−m.

Figure 7:
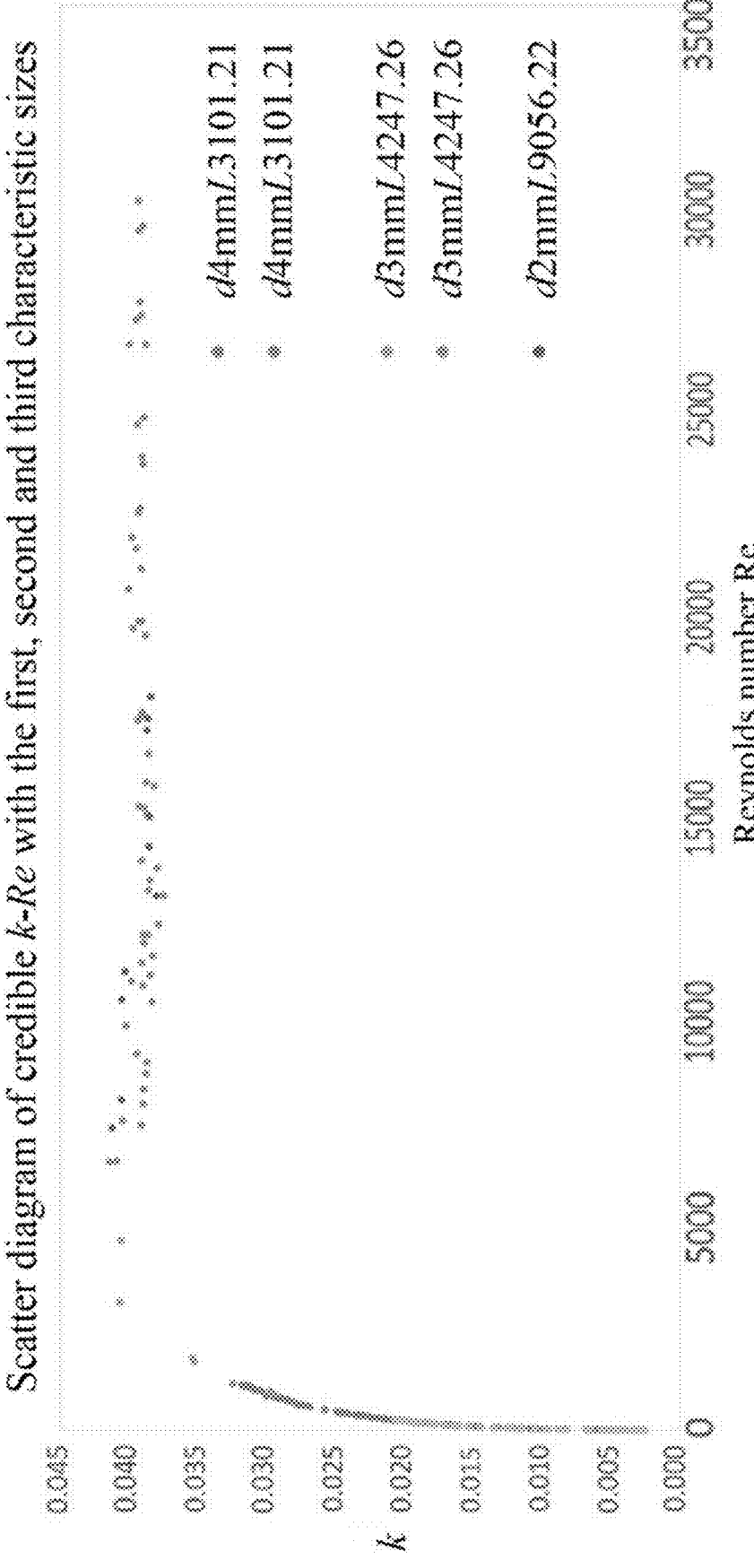
FIG. 7 is a scatter diagram of k-Re for three sizes that achieve a credible normalization degree.

Qv−(DP, ρ) is fitted according to Formula ③, results indicate a good linear relationship of Qv−(DP, ρ) at the high Reynolds numbers, both K1' and K2' can be considered constants, specifically, K1'=0.56, and K2'=2.59795, therefore, a specific expression of Formula ④ is:

$$\left(\frac{2}{3}\right)^n \left(\frac{4247.26}{9056.22}\right)^m = \frac{0.56}{2.59795}; \qquad \text{Formula (4)}$$

after adjusting the values of n and m for several times with Formula (4) as a constraint, until the relationships of k=f(Re) for the different sizes achieve the credible normalization degree under the same values of n and m, and a suitable set of values of n=2.55 and m=0.66 is then selected, in which case, the credible curves of k=f(Re) for the three characteristic sizes are then plotted on the same coordinate system, as shown in FIG. 7. FIG. 7 is a grayscale image. Although data points corresponding to each characteristic size cannot be directly seen, it does not affect the observation of the degree of overlap of the data points corresponding to the three characteristic sizes, and it can be seen from FIG. 7 that the overlap of the three credible curves of k=f(Re) is high, indicating that the credible normalization degree has been achieved.

Finally, the flow rate Q of the fluid to be measured that flows through the spiral throttling component according to the following Formula (2);

$$Q = K * \frac{d^{2.55}}{L^{0.66}} * \sqrt{\frac{DP'}{\rho'}}; \qquad \text{Formula (2)}$$

k and Re data corresponding to the credible relationships of k=f(Re) of the spiral flow channels with the first, second and third characteristic sizes are integrated when n=2.55 and m=0.66, and FIG. 7 shows that the k and Re data corresponding to the credible relationships of k=f(Re) of the three characteristic sizes are smooth and coherent. However, there are obvious inflection points locally, suggesting that piecewise fitting can be performed; a piecewise value $x_1$ of the low and medium Reynolds numbers is set to 319, a piecewise value $x_2$ of the medium and high Reynolds numbers is set to 2858, the parameters of $a_1$, $b_1$, $a_2$, $b_2$ and c in the Step 3 are fitted, and results are $a_1$=0.005445, $b_1$=0.009238, $a_2$=0.007605, $b_2$=0.02169 and c=0.03883, that is:

a relationship between the flow coefficient K and the Reynolds number Re is:

$$\begin{cases} K = 0.005445 * \ln(\text{Re}) - 0.009238, & \text{Re} < 319 \\ K = 0.007605 * \ln(\text{Re}) - 0.02169, & 319 \le \text{Re} < 2858; \\ K = 0.03883, & \text{Re} \ge 2858 \end{cases}$$

Figure 8:
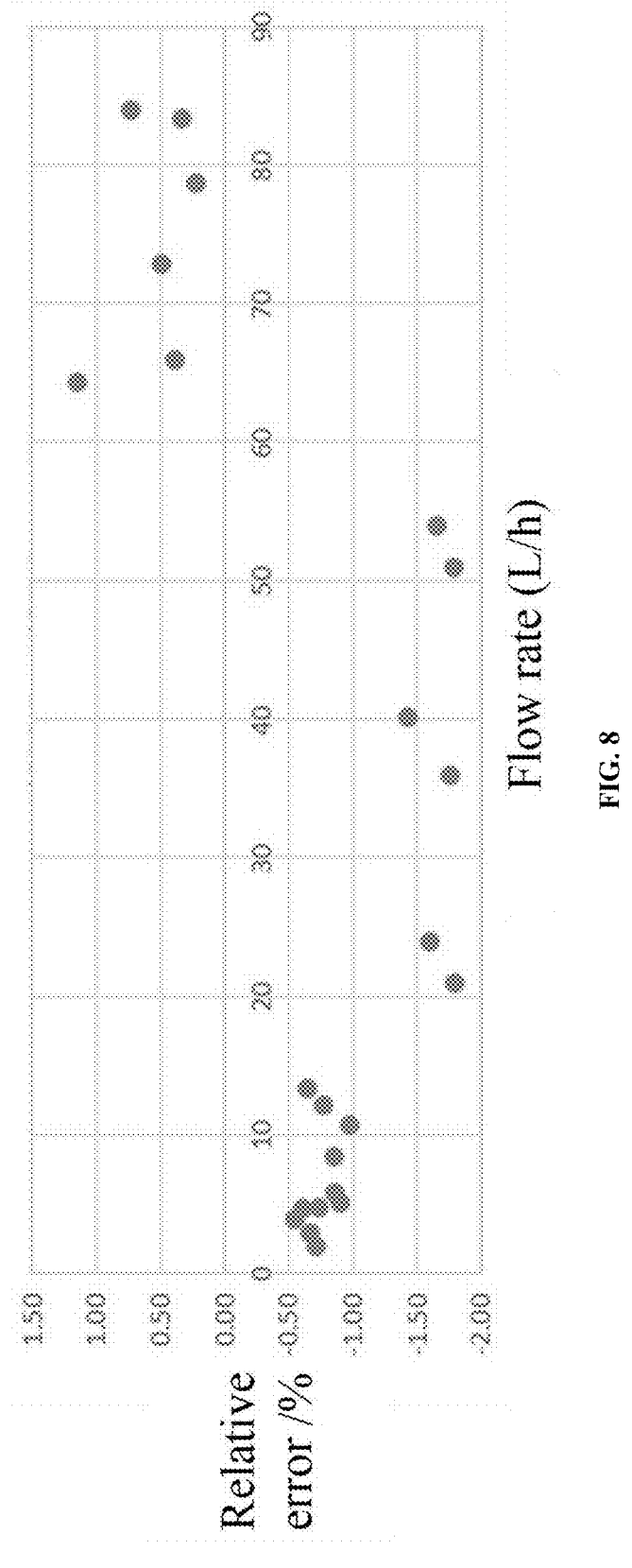
FIG. 8 is a distribution diagram of relative errors Efs (%) between reverse-calculated flow rate and calibrated flow rate of a spiral flow channel with a first characteristic size.
Figures 9, 10:
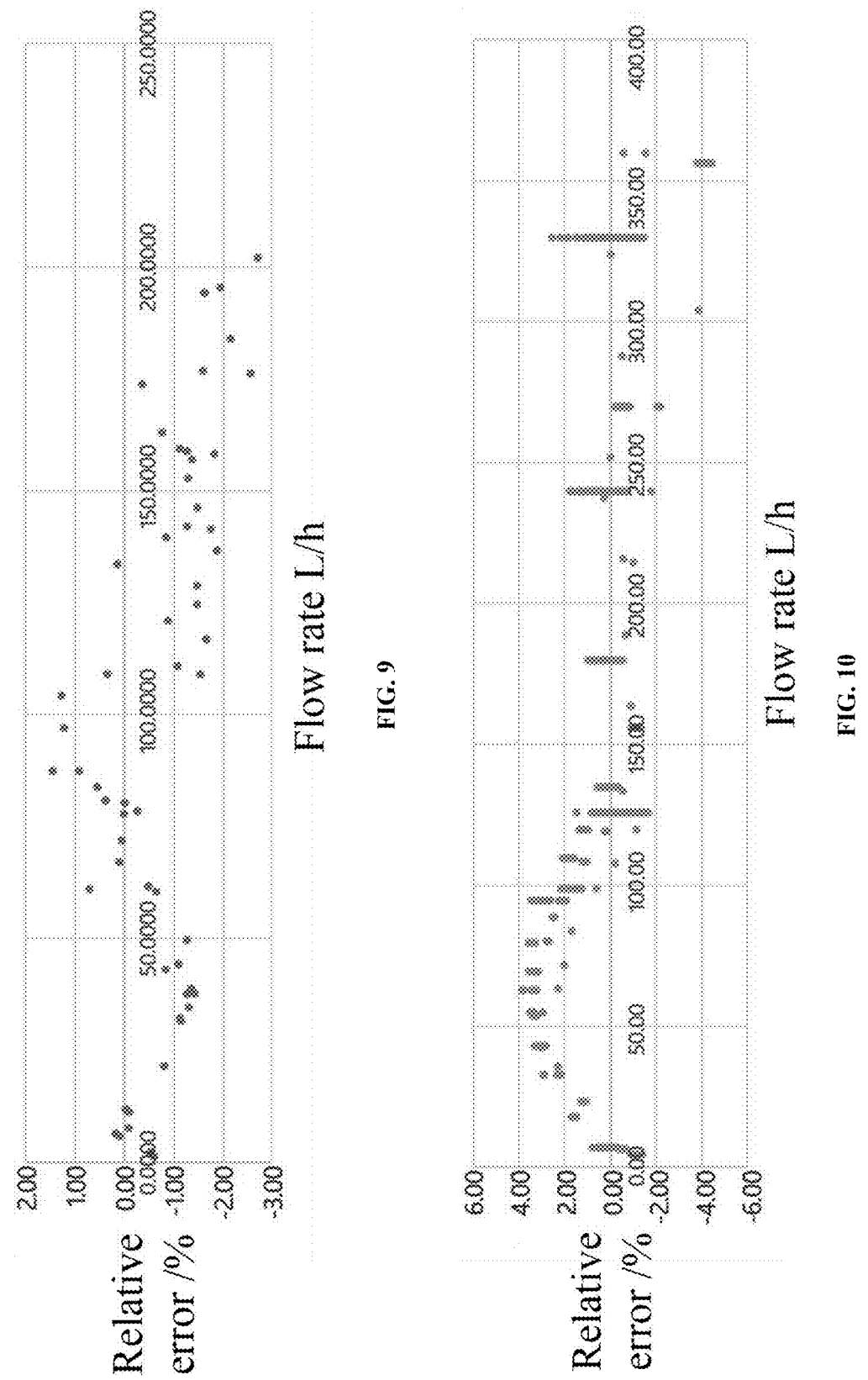
FIG. 9 is a distribution diagram of relative errors Efs (%) between reverse-calculated flow rate and calibrated flow rate of a spiral flow channel with a second characteristic size.
FIG. 10 is a distribution diagram of relative errors Efs (%) between reverse-calculated flow rate and calibrated flow rate of a spiral flow channel with a third characteristic size.

Some of the calibration data (including density, pressure drop, and Reynolds number, and the like) for the spiral flow channels with the first, second, and third characteristic sizes are taken as the data for the fluid to be measured, and are substituted into Formula 2 for reverse calculation of flow rate, so as to verify the flow measurement accuracy. Specifically, the flow rates for spiral flow channels with the first, second, and third characteristic sizes are subject to reverse calculation, a relative error Efs (%) between reverse-calculated flow rate and calibrated flow rate is calculated, and a distribution of relative errors is shown in FIGS. 8, 9, and 10. It can be seen from FIGS. 8, 9 and 10 that for the spiral flow channels with the first, second, and third characteristic sizes, the relative error between the reverse-calculated flow rate and the calibrated flow rate is relatively small, and the measurement accuracy requirements can be basically satisfied.

Embodiment 3

Further, in order to verify whether the method of the present disclosure can avoid the calibration process of spiral flow channels with other different sizes, and whether the formula obtained by the above method is applicable to the flow rate calculation of the spiral flow channels with other different sizes, three more spiral flow channels with different characteristic sizes are designed for calibration tests, and sizes of the three spiral flow channels with different characteristic sizes are respectively as follows:

a diameter of the spiral flow channel with a fourth characteristic size is d4=4 mm, and an equivalent length thereof is L4=2459.83 mm;

a diameter of the spiral flow channel with a fifth characteristic size is d5=4.5 mm, and an equivalent length thereof is L5=2459.83 mm;

a diameter of the spiral flow channel with a sixth characteristic size is d6=5 mm, and an equivalent length thereof is L6=2459.83 mm; and following the method in Embodiment 1: as described in the Step 1, introducing suitable calibration media (white oil) into the spiral flow channels with the fourth, fifth and sixth different sizes to obtain a plurality of calibration datasets (including real-time flow $Q_t$, real-time Reynolds number $\text{Re}_t$, and real-time differential pressure $DP_t$, with a one-to-one correspondence between $Q_t$-$\text{Re}_t$-$DP_t$).

The fitting results from Embodiment 2 are then used to calculate fitting flow rates of the spiral flow channels with the fourth, fifth and sixth different sizes. Specifically, the real-time Reynolds number $\text{Re}_t$ are directly substituted into the following formula:

$$\begin{cases} K_t = 0.005445 * \ln(\text{Re}_t) - 0.009238, & \text{Re}_t < 319 \\ K_t = 0.007605 * \ln(\text{Re}_t) - 0.02169, & 319 \le \text{Re}_t < 2858; \\ K_t = 0.03883, & \text{Re}_t \ge 2858 \end{cases}$$

a plurality of real-time flow coefficients $K_t$ are calculated, with a one-to-one correspondence between $Q_t$-$\text{Re}_t$-$DP_t$-$K_t$.

The real-time flow coefficients $K_t$ are substituted into Formula (2) (a value of n in Formula (2) is 2.55, and a value of m is 0.66) to calculate and obtain a plurality of fitting flow rates.

The data involved in the process is massive, and it is difficult to intuitively observe the accuracy of the flow rate measurement, so the data itself is not displayed here.

Figure 11:
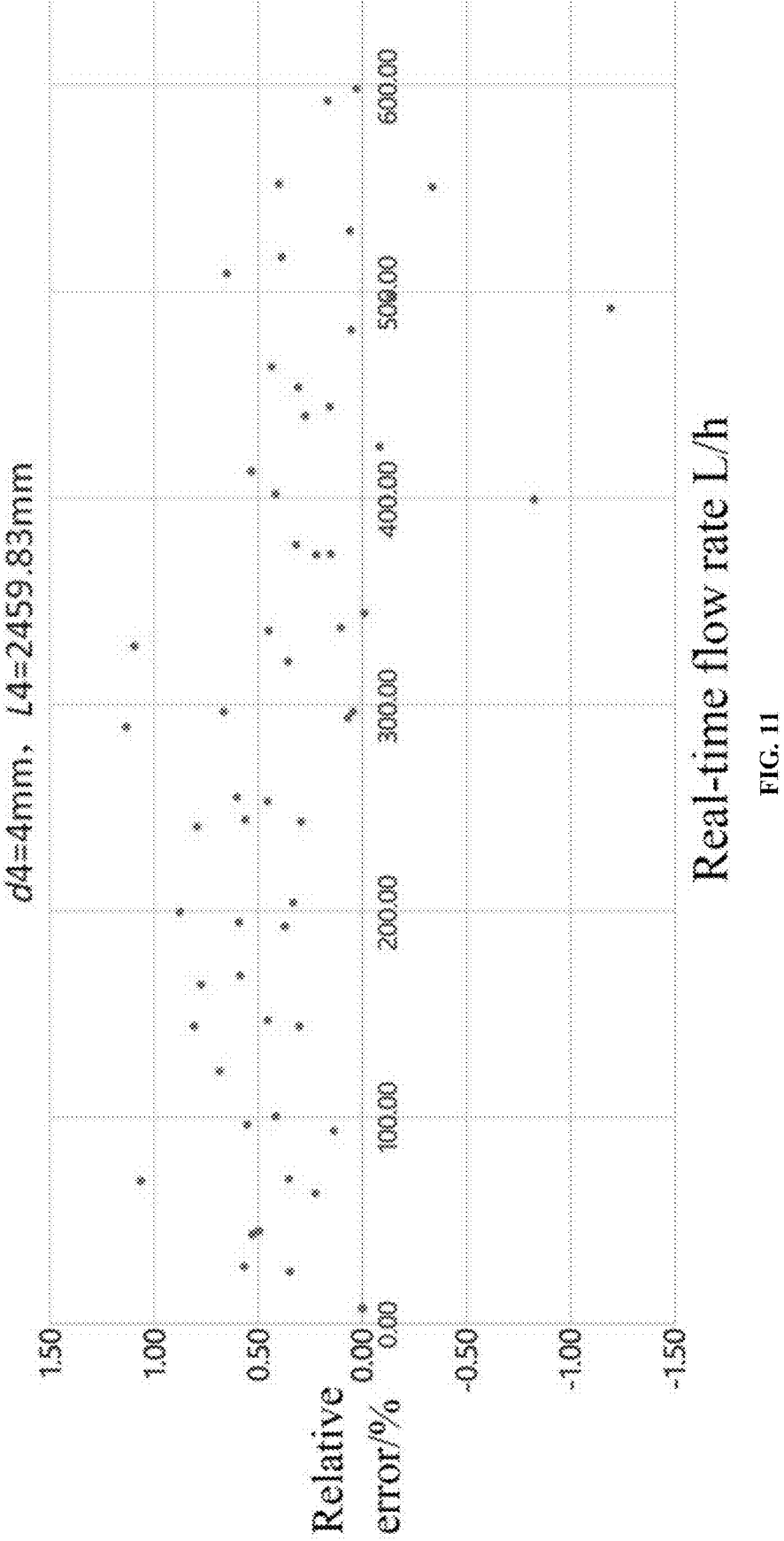
FIG. 11 is a distribution diagram of relative errors between fitted flow rate and real-time flow rate of a spiral flow channel with a fourth characteristic size.
Figure 12:
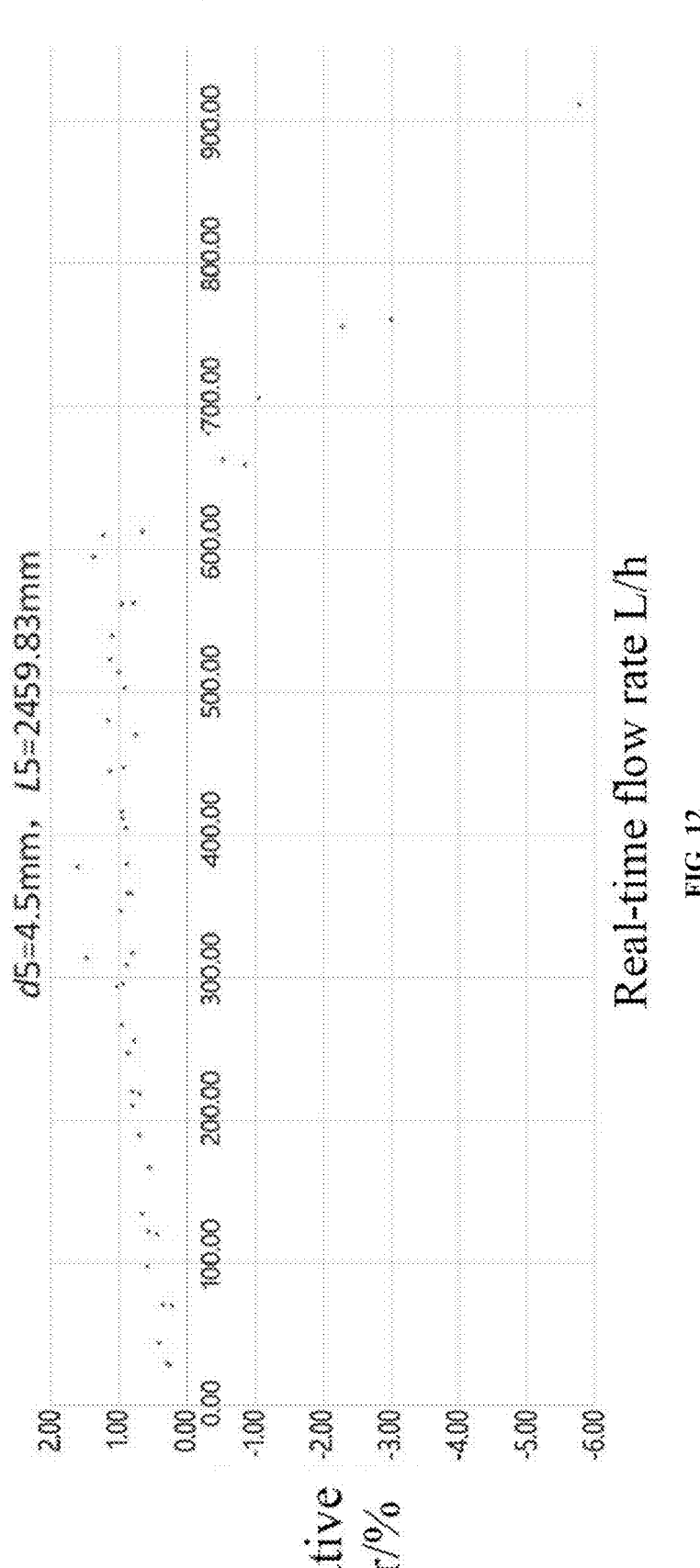
FIG. 12 is a distribution diagram of relative errors between fitted flow rate and real-time flow rate of a spiral flow channel with a fifth characteristic size.
Figure 13:
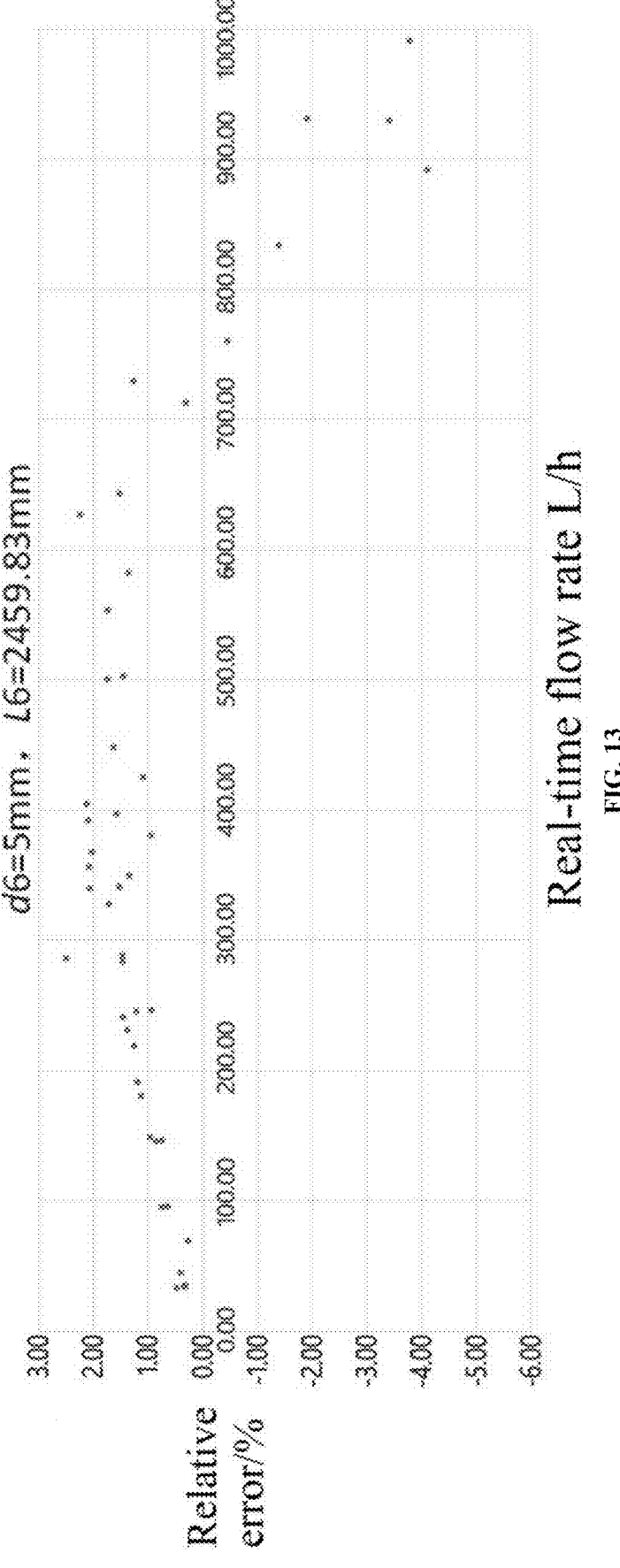
FIG. 13 is a distribution diagram of relative errors between fitted flow rate and real-time flow rate of a spiral flow channel with a sixth characteristic size.

A relative error (%) between fitted flow rate and real-time flow rate $Q_t$ is calculated, and a distribution of the relative error (%) and real-time flow rate is plotted and shown in FIGS. 11, 12, and 13.

It can be seen from FIGS. 11, 12 and 13 that for the spiral flow channels with the fourth, fifth, and sixth characteristic sizes, the relative error between the fitted flow rate and the real-time flow rate is relatively small, and the measurement accuracy requirements can be basically satisfied.

Specifically, a full-scale error (600 L/h) for the spiral flow channel with the fourth characteristic size is (−1.19%) and (+1.13%);

a full-scale error (900 L/h) for the spiral flow channel with the fifth characteristic size is (−5.75%) and (+1.61%);

a full-scale error (1000 L/h) for the spiral flow channel with the sixth characteristic size is (−5.33%) and (+2.5%); and This embodiment demonstrates where the fitting results of Embodiment 2 are applicable to flow calculations for the spiral flow channels of other different sizes, thus indicating the method of the present disclosure can avoid the calibration process of spiral flow channels with other different sizes, and has good applicability.

Beneficial effects: by adopting the technical solution of the present disclosure, a calculation formula for the spiral flow channels with different sizes can be obtained by using a small amount of calibrations, thereby avoiding the mismatch of flow formulae when the size of the spiral flow channel changes. Further, a general flow calculation formula applicable to a plurality of spiral flow channels with different size is obtained, eliminating the calibration of spiral flow channels with different sizes, reducing calibration costs and shortening delivery cycle. The accuracy of flow rate measurement is good and meets the basic metering requirements.

Finally, it should be noted that the above description is only the preferred embodiment of the present disclosure. Under the inspiration of the present disclosure, a person of ordinary skill in the art can make various similar representations without departing from the spirit of the present disclosure and the claims, and such changes all fall within the protection scope of the present disclosure.

What is claimed is:

1. A flow rate measurement method for a spiral throttling component, wherein a spiral flow channel is formed inside the spiral throttling component, and the spiral throttling component is further provided with a differential pressure sensor, and the differential pressure sensor is used to measure a pressure drop DP before and after a fluid flows through the spiral flow channel;

comprising the following steps:

step 1: introducing a calibration medium into the spiral throttling component, wherein an embedded controller samples an analog pressure signal from the differential pressure sensor at a defined sampling frequency and stores raw pressure data in a memory, and acquiring a plurality of calibration datasets, with each of the plurality of calibration datasets comprising flow rate Qv, pressure drop DP, and Reynolds number Re at a same moment;

step 2: calculating, by the embedded controller, a flow coefficient k of the calibration medium flowing through the spiral throttling component according to the following Formula ①;

$$k = \frac{Qv}{\frac{d^n}{L^m} * \sqrt{\frac{DP}{\rho}}}; \qquad \text{Formula ①}$$

d is a diameter of the spiral flow channel;
L is an equivalent length of the spiral flow channel;
n and m are both exponents;
DP is the pressure drop before and after the calibration medium flows through the spiral flow channel;
ρ is a density of the calibration medium;
adjusting values of the exponents n and m and determining a relationship of k=f(Re);

step 3: calculating, by the embedded controller, a flow rate Q of a fluid to be measured flowing through the spiral throttling component according to the following Formula ②;

$$Q = K * \frac{d^n}{L^m} * \sqrt{\frac{DP'}{\rho'}}; \qquad \text{Formula ②}$$

DP' is a pressure drop before and after the fluid to be measured flows through the spiral flow channel;
ρ' is a density of the fluid to be measured;
K is a flow coefficient of the fluid to be measured;

$$\begin{cases} K = a_1 * \ln(Re) - b_1, & Re < x_1; \\ K = a_2 * \ln(Re) - b_2, & x_1 \leq Re < x_2; \\ K = c, & Re \geq x_2; \end{cases}$$

$a_1$ and $b_1$ are fitting parameters for a low Reynolds number and are obtained by fitting the relationship of k=f(Re) in the step 2;
$a_2$ and $b_2$ are fitting parameters for a medium Reynolds number and are obtained by fitting the relationship of k=f(Re) in the step 2;
c is a fitting constant for a high Reynolds number and is obtained by fitting the relationship of k=f(Re) in the step 2;
Re is a Reynolds number for the fluid to be measured;
$x_1$ is a piecewise value of the low Reynolds number and the medium Reynolds number; and
$x_2$ is a piecewise value of the medium Reynolds number and the high Reynolds number,
wherein the embedded controller automatically outputs the computed flow rate Q to the display in real time; and
step 4: actuating, by the embedded controller, a downstream flow-control valve to adjust the flow of the fluid based on the computed flow rate Q.

2. The flow rate measurement method for the spiral throttling component according to claim 1, wherein the diameter d and/or the equivalent length L of the spiral flow channel are changed, such that different characteristic sizes of the spiral flow channel is obtained;
repeating the steps 1 and 2 to obtain relationships of k=f(Re) for a plurality of different characteristic sizes; and
comparing a normalization degree of k=f(Re) for different characteristic sizes, and continuing to adjust the values of n and m until relationships of k=f(Re) for different characteristic sizes under a same set of values of n and m achieve a normalization degree; and
in the step 3, the parameters $a_1$, $b_1$, $a_2$, $b_2$, and c are obtained by fitting k-Re data corresponding to all different characteristic sizes obtained in the step 2.

3. The flow rate measurement method for the spiral throttling component according to claim 2, wherein in the step 2, the values of the exponents n and m are adjusted, a plurality of flow coefficients k for a plurality of datasets of the calibration medium under each set of the values of the exponents n and m are calculated, k-Re curves are plotted respectively, and one smooth and continuous k-Re curve thereof is selected for fitting to obtain the relationship of k=f(Re).

4. The flow rate measurement method for the spiral throttling component according to claim 3, wherein the k-Re curves for the relationships of k=f(Re) for different characteristic sizes are plotted, overlaps of the k-Re curves for different characteristic sizes are observed and compared, and the values of the exponents n and m are adjusted until the k-Re curves overlap, thereby specifying that the relationships of k=f(Re) for different characteristic sizes achieve the normalization degree.

5. The flow rate measurement method for the spiral throttling component according to claim 2, wherein in the step 2, a method for adjusting the values of the exponents n and m is as follows:

selecting spiral flow channels with two different characteristic sizes, the spiral flow channel with a first characteristic size has a diameter of d1 and an equivalent length of L1, and the spiral flow channel with a second characteristic size has a diameter of d2 and an equivalent length of L2;

selecting a plurality of calibration datasets corresponding to a high Reynolds number range for the two different characteristic sizes; and fitting a relationship of Qv-(DP, ρ) according to the following Formula ③:

$$Qv = K^\backslash \sqrt{DP/\rho}\,;\qquad\text{Formula ③}$$

K' is a coefficient comprising the characteristic size of the spiral flow channel;

a coefficient obtained by fitting the spiral flow channel with the first characteristic size is K1', wherein K1' is a constant;

a coefficient obtained by fitting the spiral flow channel with the second characteristic size is K2', wherein K2' is a constant; and the values of the exponents n and m also satisfy the following Formula ④:

$$\frac{d1^{n}}{L1^{m}}\Big/\frac{d2^{n}}{L2^{m}} = K1'/K2'.\qquad\text{Formula ④}$$

6. The flow rate measurement method for the spiral throttling component according to claim 4, wherein in the step 2, a method for adjusting the values of the exponents n and m is as follows:

selecting spiral flow channels with two different characteristic sizes, the spiral flow channel with a first characteristic size has a diameter of d1 and an equivalent length of L1, and the spiral flow channel with a second characteristic size has a diameter of d2 and an equivalent length of L2;

selecting a plurality of calibration datasets corresponding to a high Reynolds number range for the two different characteristic sizes; and fitting a relationship of Qv-(DP, ρ) according to the following Formula ③:

$$Qv = K^\backslash \sqrt{DP/\rho}\,;\qquad\text{Formula ③}$$

K' is a coefficient comprising the characteristic size of the spiral flow channel;

a coefficient obtained by fitting the spiral flow channel with the first characteristic size is K1', wherein K1' is a constant;

a coefficient obtained by fitting the spiral flow channel with the second characteristic size is K2', wherein K2' is a constant; and the values of the exponents n and m also satisfy the following Formula ④:

$$\frac{d1^{n}}{L1^{m}}\Big/\frac{d2^{n}}{L2^{m}} = K1'/K2'.\qquad\text{Formula ④}$$

\*　\*　\*　\*　\*